(12) United States Patent
Gaeta et al.

(10) Patent No.: US 7,233,721 B2
(45) Date of Patent: Jun. 19, 2007

(54) LOW LOSS SPECTRALLY PERIODIC ALL-FIBER FILTERS

(75) Inventors: Zagorka Dacic Gaeta, Ithaca, NY (US); Dmitri Vladislavovich Kuksenkov, Painted Post, NY (US); William Allen Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/526,406

(22) Filed: Sep. 25, 2006

(65) Prior Publication Data
US 2007/0077014 A1 Apr. 5, 2007

Related U.S. Application Data

(60) Provisional application No. 60/722,822, filed on Sep. 30, 2005.

(51) Int. Cl.
*G02B 6/26* (2006.01)
*G02B 6/02* (2006.01)

(52) U.S. Cl. .................................. 385/28; 385/126
(58) Field of Classification Search ............. 385/27, 385/28, 29, 30, 31, 37, 50, 123, 124, 126, 385/127, 141, 142, 96, 98
See application file for complete search history.

(56) References Cited

U.S. PATENT DOCUMENTS 5,732,170 A * 3/1998 Okude et al. ............... 385/27
5,796,891 A * 8/1998 Poustie et al. .............. 385/28
6,429,963 B1 * 8/2002 Berkey et al. ........... 359/337.2
6,487,340 B2 * 11/2002 Enomoto et al. ............ 385/37
2004/0184815 A1 9/2004 Korolev et al. ............ 398/148

OTHER PUBLICATIONS

Horche, et al "Spectral Behavior Of A Low-Cost All-Fiber Component Based On Untapered Multifiber Unions", IEEE Photonics Technology Letters 1 (1989) July, No. 7, Jul. 1989 pp. 184-187.

(Continued)

*Primary Examiner*—Quyen Leung
(74) *Attorney, Agent, or Firm*—Gregory V. Bean (57) ABSTRACT

The present invention provides a method and resulting device for producing a low-loss spectrally periodic all fiber filter by providing a multi-mode fiber capable of propagating an LP01 mode and an LP02 mode at wavelengths of interest and providing a single-mode fiber capable of propagating a fundamental mode at the wavelengths of interest and splicing a selected length of the multi-mode fiber between lengths of the single-mode fiber, where the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 70%, desirably at least 80% and most desirably at least 90%, and the extinction ratio of the filter is at least 10 dB. The method may also include the step of monitoring light passing through the spliced length of the multi-mode fiber while tapering the multi-mode fiber to adjust the spectral profile of the resulting filter.

17 Claims, 5 Drawing Sheets

OTHER PUBLICATIONS

Lopez-Amo, et al *"Design of Two-Mode Interference Wavelength Filter Utilising Symmetric Three-Mode Structure"*, Electronic Letters Nov. 24, 1988 vol. 24, No. 24, pp. 1526-1527.

Li, et al *"Demonstration of high extinction ratio modal interference in a two-mode fiber and its applications for all-fiber comb filter and high-temperature sensor"*, Optics Communications 250 (2005) 280-285, no month.

Presentation and Article "A novel electrically tuned all-fiber comb filter" by Qun Li, Chien Hung Lin and Henry P. Lee; Dept. of EECS, Henry Sammueli School of Engineering, University of California, *Optical Fiber Communication Conference, 2004. OFC 2004* Publication Date: Feb. 23-27, 2004.

A. J. Poustie, N. Finlayson, P. Harper, "Multiwavelength fiber laser using a spatial mode beating filter" Optics Letters, v. 19, No. 10, pp. 716-717, 1994, May 1994.

* cited by examiner

LOW LOSS SPECTRALLY PERIODIC ALL-FIBER FILTERS

This application claims priority to and the benefit of U.S. Provisional Patent Application No. 60/722822, filed Sep. 30, 2005.

BACKGROUND OF THE INVENTION

1. Field of the Invention

The present invention relates generally to optical communications, and more specifically to fiber-based devices and methods for providing low-loss spectrally periodic filtering of an optical signal.

2. Technical Background

Soliton optical communication systems can greatly benefit from the use of narrowband spectral filters spaced at appropriate intervals along the optical fiber within the system. Narrowband filters pass through the useful spectral content of an optical signal and reject broadband ASE (amplified-spontaneous-emission) noise. By "guiding" the central frequency of the soliton pulses to the middle of the filter passband, such filters can significantly reduce the accumulation of jitter in soliton pulse arrival times caused by Gordon-Haus and acoustic-interaction effects. For this reason, such filters are often known as frequency-guiding filters. See, for example, P. V. Mamyshev, "Solitons in optical fiber communication systems", in *Fiber Optics Handbook*, McGraw-Hill, 2003.

It has also been suggested that narrowband spectral filters, inserted at certain intervals between segments of nonlinear positive dispersion fiber, can significantly increase the dynamic range of a nonlinear-fiber-based dispersion compensator. See, for example, U.S. Patent Publication Number 2004-0184815, published 23 Sep. 2004, and assigned to the assignee of the present case. Similar to soliton transmission, the increase is achieved by limiting the signal distortion and timing jitter that arises from the nonlinear mixing of the optical data signal and broadband ASE noise.

For application in wavelength-division-multiplexed optical transmission systems, frequency-guiding or noise-rejecting spectral filters need to have multiple passbands, one for each channel. Since WDM channels are typically positioned at standard frequencies corresponding to the ITU grid, with spacing of 50 GHz or an integer multiple thereof (typically 100, 200, or 400 GHz), the same relatively small periodicity is required of a bandpass filter.

To reduce the amount of additional signal amplification required in a soliton-transmission application, it is desirable to use frequency-guiding filters with low insertion loss. For use in dynamic dispersion compensation applications, low filter loss is critical, since optical signal power must be kept close to the fundamental soliton power at every point within the nonlinear fiber.

Several technologies have been used or suggested for producing low loss periodic (frequency or spectrum-periodic) filters. One well-known technology is based on fiber Mach-Zehnder interferometers, using the so-called BFT (biconic fused tapered) couplers. In a typical BFT Mach-Zehnder interferometer, two dissimilar fibers are fused and tapered together at two different points. Approximately half of the light entering the first fuse point in one of the fibers is transferred to the second fiber. The interferometer is completed at the second fuse point, at which the light is coupled back into the first fiber. Unfortunately it is difficult to manufacture this type of device with bandpass periodicity as small as 50-400 GHz, because this requires a relatively large fiber length between tapers.

Periodic filters can also be made using planar waveguide interferometers, but small spacing between transmission peaks is difficult to achieve with this technology as well.

Filters with small spectral periods can be made using thin-film Fabry-Perot etalons or bulk optics based Mach-Zehnder interferometers, but they typically have an insertion loss on the order of 1 dB or even higher because of the additional optics required to collimate the light beam from the input fiber and to couple it into the output fiber.

Modal interference within multi-mode fiber has also been used to produce spectrally-periodic (or "comb") filters. For example, in A. J. Poustie, N. Finlayson, P. Harper, "Multi-wavelength fiber laser using a spatial mode beating filter", *Optics letters*, v. 19, No. 10, pp. 716-717, 1994, a comb filter is formed within a laser cavity by splicing a section of multi-mode fiber between two sections of a single-mode fiber. Similarly, in Q. Li, C-H Lin, P-Y Tseng, H. P. Lee, "Demonstration of High Extinction Ratio Modal Interference in a Multi-mode Fiber and Its Applications for All-Fiber Comb Filter and High-Temperature Sensor", Optics Communications 250 (2005), 280-285, modal interference within a multi-mode fiber was used to produce a spectrally periodic filter with relatively small period. But insertion loss (>2 dB) and filtering performance were less than optimal for soliton-based systems, and particularly for dynamic dispersion compensation.

A need thus exists to develop suitable filters and suitable methods for producing filters with relatively high bandpass periodicity (of 400-50 GHz, or even tighter spacing) together with low insertion loss and sufficient extinction ratio (of at least 10 dB or more).

SUMMARY OF THE INVENTION

One aspect of the present invention relates to a method for producing a low-loss spectrally periodic all fiber filter by providing a multi-mode fiber capable of propagating an LP01 mode and an LP02 mode at wavelengths of interest and providing a single-mode fiber capable of propagating a fundamental mode at the wavelengths of interest and splicing a selected length of the multi-mode fiber between lengths of the single-mode fiber, where the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 70%, desirably at least 80%, and most desirably at least 90%, and the extinction ratio of the resulting filter is at least 10 dB.

The method may also include the step of monitoring light passing through the spliced length of the multi-mode fiber while tapering the multi-mode fiber to adjust the spectral profile of the resulting filter. The splicing performed is desirably fusion splicing for durability and stability, but mechanical splicing may also be employed.

In one alternative embodiment, the single-mode fiber capable of propagating a fundamental mode at the wavelengths of interest may be a special pigtailing fiber, such as a parabolic core pigtailing fiber with small effective area. The core of such a special pigtailing fiber may be thermally diffusion-expanded to match the effective area of another fiber to which it will be spliced. Alternatively, its low effective area permits splicing directly and with low loss to DC (dispersion compensating) fiber.

In another aspect, the present invention relates to a low-loss spectrally periodic all fiber filter comprising two lengths of a single-mode fiber capable of propagating a fundamental mode at the wavelengths of interest and a length of a multi-mode fiber capable of propagating an LP01 mode and an LP02 mode at wavelengths of interest spliced between the two lengths of single-mode fiber, where the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interest is at least 70%, desirably at least 80%, and most desirably at least 90%, and the extinction ratio of the filter is at least 10 dB.

In yet another aspect, the present invention relates to a method of producing a low-loss spectrally periodic all fiber filter, the method including (1) providing a multi-mode fiber including a central core, a moat, and a ring, and capable of propagating an LP01 mode and an LP02 mode at wavelengths of interest; (2) providing a single-mode fiber capable of propagating a fundamental mode at the wavelengths of interest; and (3) splicing a selected length of the multi-mode fiber between lengths of the single-mode fiber, where the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interest is at least 70%, desirably at least 80%, and most desirably at least 90%, and the extinction ratio of the resulting filter is at least 10 dB.

The devices and methods of the present invention result in a number of advantages over prior art devices and methods. For example, a rugged, inexpensive, and very-low loss spectrally periodic filter can be provided, having a relatively tight period spacing as is useful for WDM and DWDM systems. Further, by use of special pigtailing fibers as disclosed herein, one filter may be used, with fairly low insertion loss, in a variety of systems or devices with a variety of fiber types. Reliable manufacturing of the fibers is enabled both because the performance of the filter is assured by the cooperating properties of the single and multimode fibers and is not heavily dependent on splicing technique, and because an easy tuning method is provided for bringing the filters into exact spectral alignment with the desired filter function.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention and together with the description serve to explain the principles and operation of the invention.

DEFINITIONS

The following definitions are in accord with common usage in the art.

The refractive index profile is the relationship between refractive index and optical fiber radius.

Delta, $\Delta$, is the relative refractive index percent $\Delta=(n_i^2-n_c^2)/2n_c^2$, where $n_i$ is the specified refractive index in region i, and $n_c$ is the average refractive index of the cladding region. Deltas are conventionally expressed as percents.

The following definition may vary somewhat from some usage in the art.

Single mode fiber is fiber that, in the context and in the way in which it is used, transmits a single mode signal entering the fiber as a single mode signal exiting the fiber.

DETAILED DESCRIPTION OF THE PREFERRED EMBODIMENTS

According to one aspect of the present invention, a method is provided for producing a low-loss spectrally periodic all fiber filter. The basic steps of the method 10 are outlined in the flowchart of FIG. 1.

Figure 1:
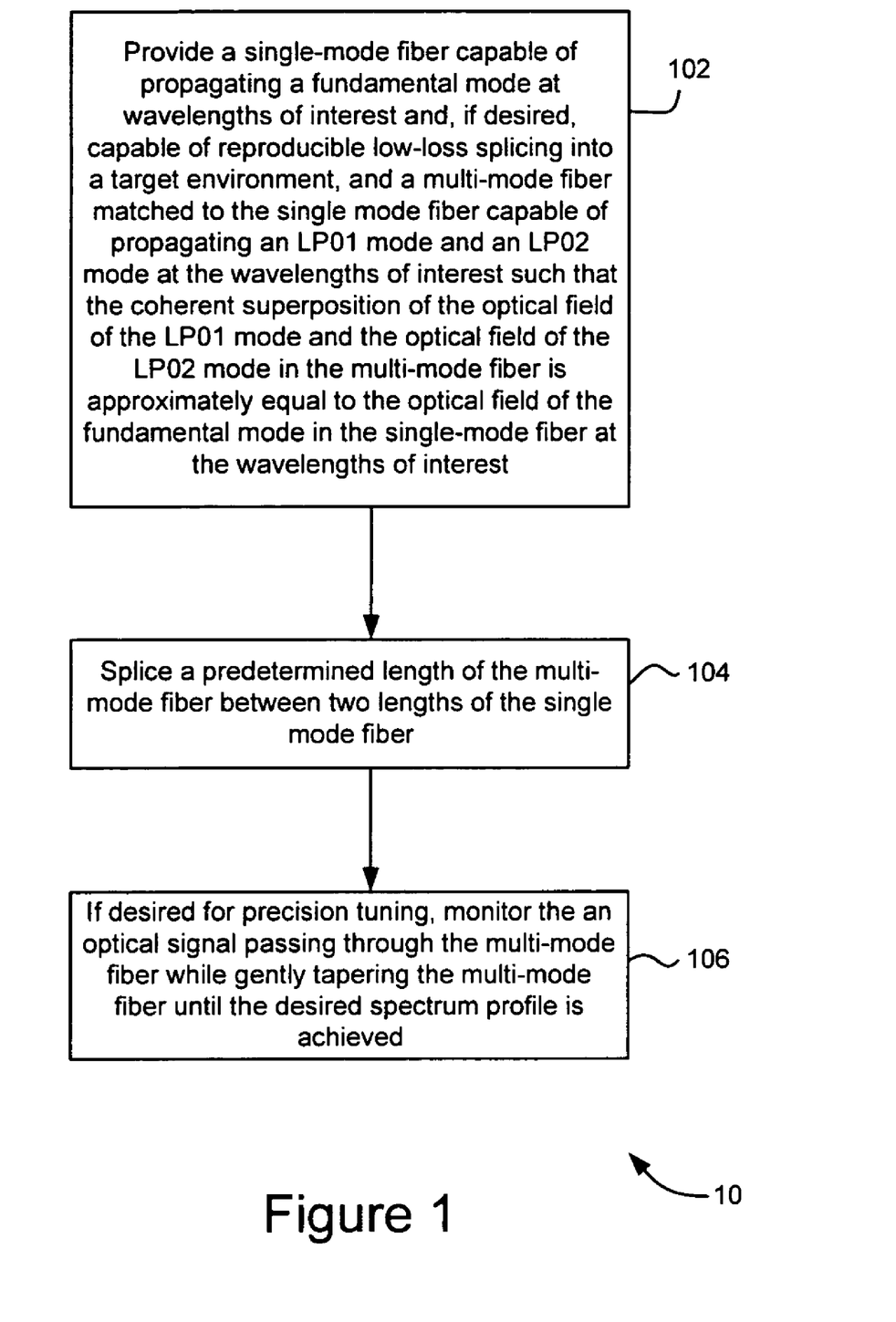
FIG. 1 is a flowchart of an embodiment of a method according to the present invention.

As a first step 102, two types of fiber are selected or otherwise provided, one single mode and one multi-mode.

The single mode fiber is selected according to the application for which it is intended, and may be chosen by criteria related to the system within which the filter is to be used, such as splicing compatibility and ease, performance at desired wavelengths, performance with desired signal formats, environmental factors, and the like. The single mode fiber may function as the pigtail of the resulting filter. Alternately, the single mode fiber can be an integral part of an optical device, module, or system, and not a pigtail to be spliced later. While not required, consideration in selecting the single mode fiber may also be given to satisfying the relationship between the single mode fiber and multi-mode fiber described immediately below.

The multi-mode fiber is selected such that it is both capable of propagating an LP01 mode and an LP02 mode at the wavelengths of interest and such that the coherent superposition of the optical field of the LP01 mode and the optical field of the LP02 mode is approximately equal to the optical field of the fundamental mode in the single-mode fiber. In particular, the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 70%, desirably at least 80%, and most desirably at least 90%, while the extinction ratio of the resulting filter is at least 10 dB.

This single and multi-mode fiber matching helps assure that reliable low-loss splicing can be performed, with the multi-mode fiber being capable of receiving power into both the LP01 and LP02 modes in approximately equal amounts from the single-mode fiber, and without depending on such inherently variable processes as long-arc-time splicing to alter and somehow match to some degree the fiber profiles of the fibers being spliced. Alternatives to fusion splicing may also be used, since there is no dependency on fusion-splicing induced changes in the fibers.

To determine a fiber profile for a multi-mode fiber that well achieves the above relationship, known algorithmic methods such as genetic algorithms or simulated annealing may be employed, in conjunction with standard mode-solving techniques. For example, beginning with a more or less generic ring and moat fiber profile, a genetic algorithm or a simulated annealing algorithm can be used to vary the profile, and a mode solver can calculate or otherwise simulate the resulting modes for comparison to the ideal relationship described above. Feedback to the algorithm allows an improved solution to emerge after sufficient iteration. Particular constraints on the permissible variations within the algorithm can be used, if desired. For example, it may be desired to require that all resulting profiles are stepped profiles, in order to increase the ease of manufacturing a fiber corresponding to the resulting profile.

EXAMPLE

Figure 2:
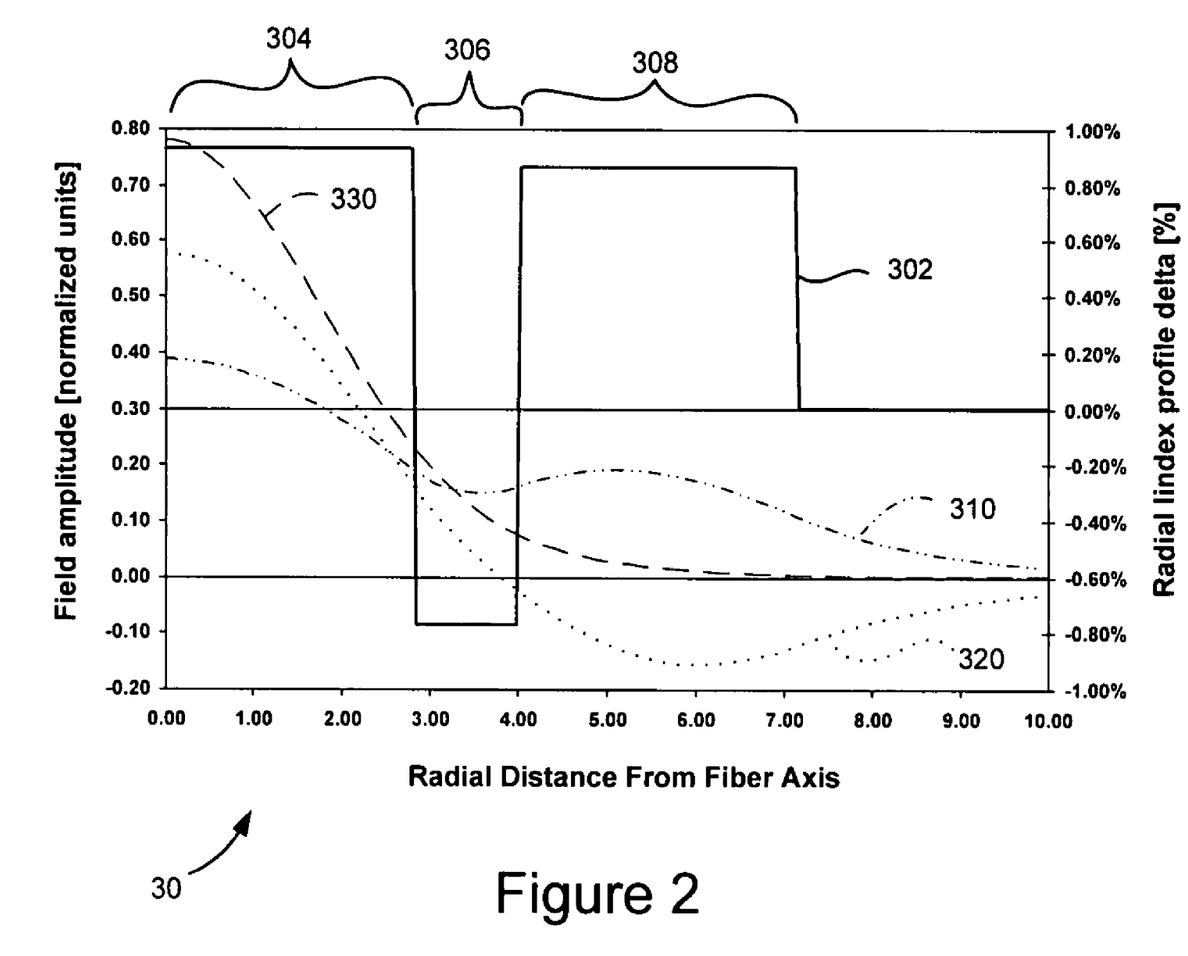
FIG. 2 is a graph of an index profile and optical field distributions relating to an embodiment of the present invention.

A refractive index profile 302, determined as described above, of a type of multi-mode fiber suitable for use in an embodiment of the present invention is shown in the graph 30 of FIG. 2. The refractive index profile 302, and the corresponding structure of the fiber, includes a core 304, a moat 306 and a ring 308. As may be seen in the Figure, the refractive-index delta of the core 304 and the ring 308 are approximately equal in the profile of this embodiment. In general, the refractive-index delta of the ring 308 desirably varies from that of the core by less than 15%, most desirably by less than 10%. This helps ensure significant guidance of the LP02 mode, allowing for the high-fraction approximately 50/50 power split at the splice point desirable in filters of the present invention.

Also shown in the graph 30 of FIG. 2 are the field amplitude 310 of the LP01 mode and the field amplitude 320 of the LP02 mode in the multimode fiber, and the filed amplitude 330 of the fundamental mode in the single mode fiber. As may be seen in the figure, the portions of the fields of the LP01 and LP02 modes guided by the ring 308, as well as the tail portions of the fields extending beyond the ring 308, are substantially equal in magnitude (amplitude) but opposite in sign (phase). Thus the ring-guided portions of the two modes essentially cancel, so that the coherent superposition of the two modes is approximately equal to the field amplitude 330 of the fundamental mode of the single mode fiber. This allows for approximately 50/50 power split between the two modes in the multimode fiber when spliced to the single mode fiber, and for low insertion loss of the splice, potentially as low as 0.1 dB, or even less, dependent mainly on splice performance.

The index profile depicted in FIG. 2 resulted from optimizing the multi-mode fiber (or "filter fiber") profile, as described above, for use with a 2% delta parabolic core pigtail fiber with a very small effective area of 20 µm². Such pigtail fiber is often used as an intermediate fiber to minimize splice loss between two strongly dissimilar fiber types, particularly to splice from (typically) very small effective area DC (dispersion compensating) fiber and standard single mode or other larger-effective area fiber.

It is important to note that an optimum filter-fiber design can be found for any type of single mode fiber, including standard single mode fiber, transmission fiber such as LEAF® or TrueWave™ available from Corning Incorporated, Corning, N.Y., or other transmission fibers, high-delta component fiber, etc. It can be expected that the various designs of multimode or filter fiber for use with these various fiber types will mostly differ from the index profile of FIG. 2 in the radial scale, depending on the MFD of a particular single-mode fiber of choice.

In the filter fiber, both modes propagate and the power in each of them remains constant. However, the shape of the field does not remain constant because the propagation constants of the two modes are not the same. Thus as the light propagates through the filter fiber, the shape of the superposition field evolves in a periodic pattern. The exact length of the period is equal to the beatlength between the two modes, which is equal to $2\pi/\Delta\beta_{12}$, where $\Delta\beta_{12}=\beta_{01}-\beta_{02}$ is the difference between the propagation constants of the two modes. At every full period the field is identical to its initial shape, which is approximately identical to the input field. If the other end of the filter fiber is spliced to the single mode fiber at exactly such a point, the power transmitted will be nominally 100% (reduced by the splicing loss and any wave-length dependent effects). However, if the splice is placed at exactly half the period, no light will be transmitted into the fundamental mode of the single mode fiber (again neglecting any wavelength-dependent effects).

The beatlength in the filter fiber is also a function of wavelength, however, such that the transmitted power will be a periodic function of wavelength (frequency). A filter of the type desired, multiple channel comb filter, achieves its desired function when the period of transmitted power variations is equal to the channel separation of the multiple channels within the applicable optical transmission system. This is achieved by selecting the correct length of the filter-fiber. In the case of the filter-fiber profile of the type shown in FIG. 2, the difference between effective refractive indices of the two modes is approximately $3 \times 10^{-3}$, which requires 200-300 mm of fiber to produce a filtering function with 200 GHz WDM separation between transmission peaks.

The tuning procedure described above is used to ensure the correct placement of the transmission peaks of the filter at the centers of the transmission channels. Each filter is manufactured starting with a piece of the multi-mode fiber cut to a prescribed length. Because of variability in the fiber profile that cannot be completely eliminated from the fiber-manufacturing process, and the small variability of the splicing process, the resulting filter may have a spectral profile slightly off from the desired one. But by connecting the filter to a light source on one side and a spectrum analyzer on the other, and gently tapering the filter fiber, the $\Delta\beta$ will change and the filter function can be adjusted to agree exactly with the desired spectral profile.

Fusion splicing allows for very low-loss splices, and appropriate adjustment of the splicing procedure should result in total insertion loss for filters of the present type as low as 0.1 dB or even less. A filter 40 of the present invention is shown, in schematic cross-section and not to scale, in FIG. 3. The filter 40 is represented in place or in use, as in a device or optical transmission system. A multi-mode "filter fiber" 402 is spliced between to single mode pigtail fibers 404, thus forming the filter of the present invention. The single-mode pigtail fibers 404 are in turn spliced to system or device fibers 406 of the same general type as pigtail fibers 404. There are thus four total splices 408, although this number may be reduced by two if the particular application allows the filter fiber 402 to be spliced directly to the system or device fibers 406.

There exist fibers, however, such as dispersion-compensating (DC) fibers with very strongly down-doped regions or moats that are difficult to splice with an acceptable amount of loss, even to themselves. Accordingly, in an alternative embodiment of a filter 50 according to the present invention shown in FIG. 4, a special pigtail fiber 504 is spliced to the filter fiber 502. This special pigtail fiber may be of the type described above in connection with FIG. 2, a 2% delta parabolic core pigtail fiber with a very small effective area of 20 $\mu m^2$. The index profile of filter fiber 502 then corresponds to the profile 302 in FIG. 2.

Figure 4:
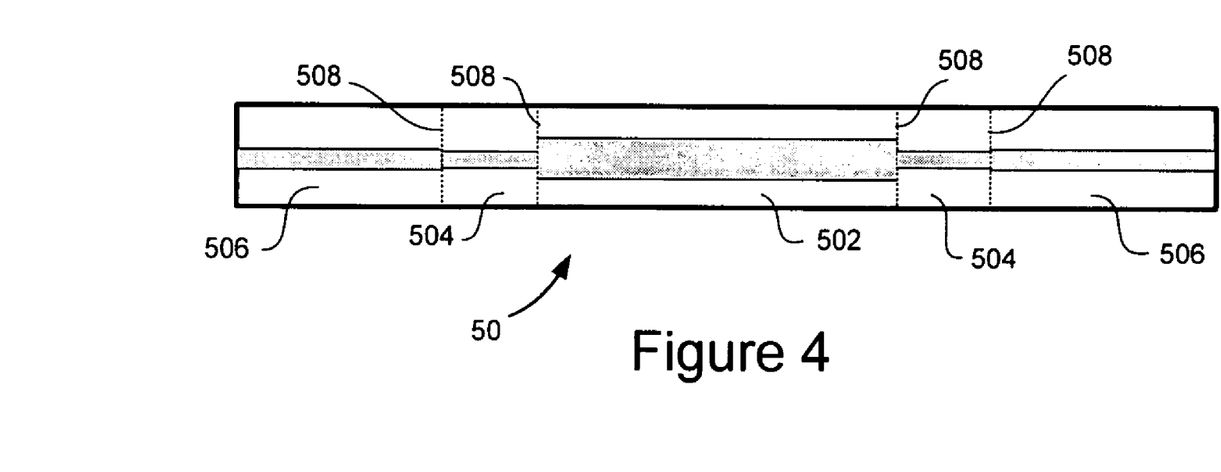
FIG. 4 is a schematic cross section of an embodiment of another device according to the present invention.

The very small effective area of the special pigtail fiber 502 allows for low-loss splicing to fibers such as DC fiber, such that the system or device fiber 506 may be in the form of DC fiber, yet without resulting in high splicing losses. The special pigtail fiber 504 also provides flexibility, in that it its core can be readily expanded, if desired, by diffusion, to match the effective area of typical single mode fiber, for example. Thus the system or device fiber 506 may also be single mode fiber, or other types of fiber.

Figure 3:
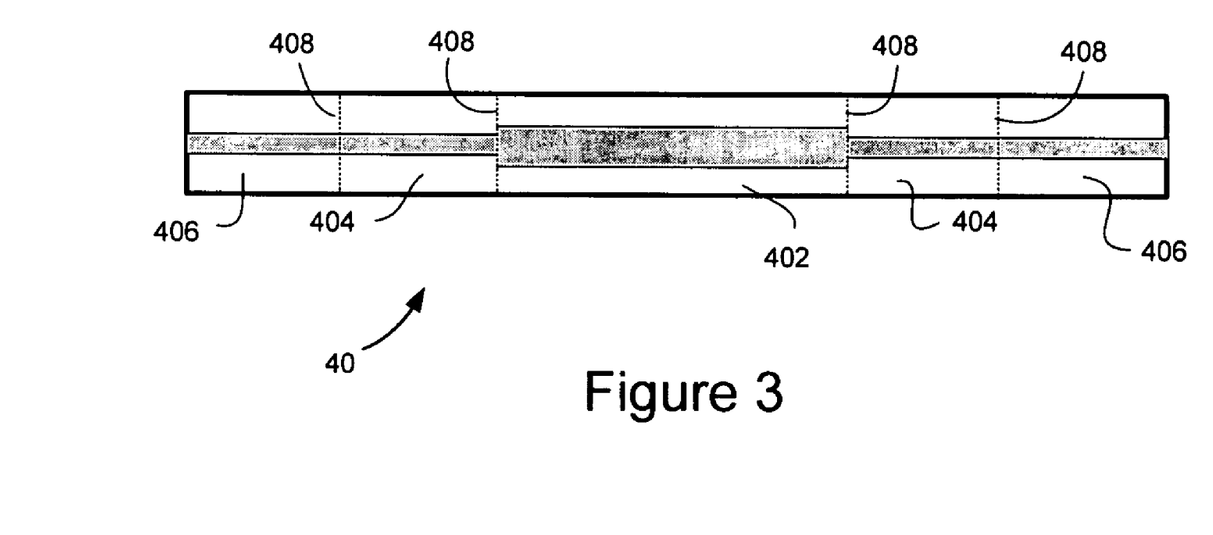
FIG. 3 is a schematic cross section of an embodiment of a device according to the present invention.

This embodiment of the filter 50 of the present invention results in four splices 508 which cannot be reduced to only two as in the embodiment of FIG. 3. But this embodiment of FIG. 4 has the advantage that the multi-mode or filter fiber 502 needs to be optimized and produced only once, according to its relationship to the special pigtail fiber 504, and then the resulting filter can be spliced, with relatively low insertion loss, into a variety of settings.

Figure 5:
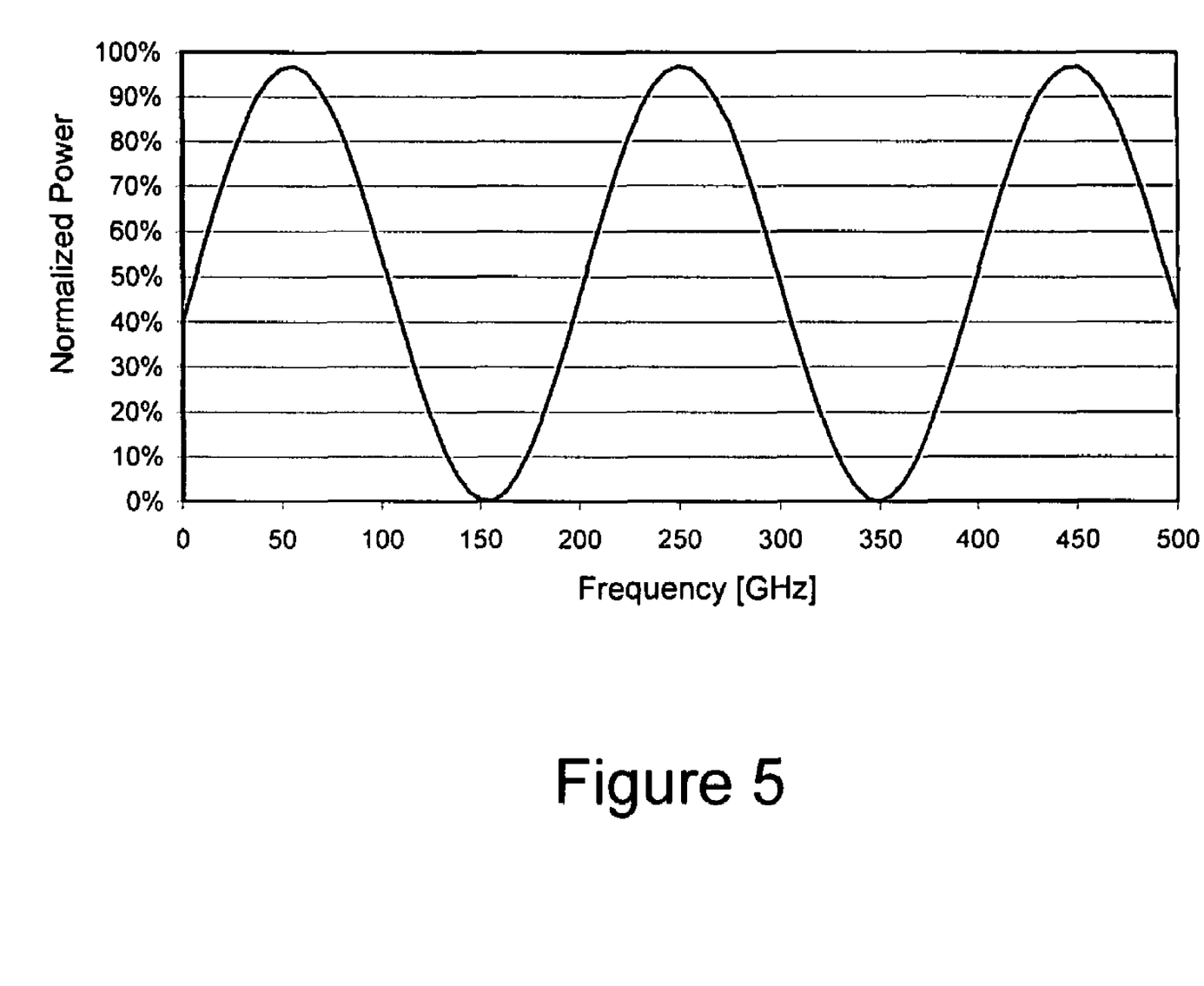
FIG. 5 is a graph of an optical filtering function achievable by an embodiment of a device according to the present invention.
Figure 6:
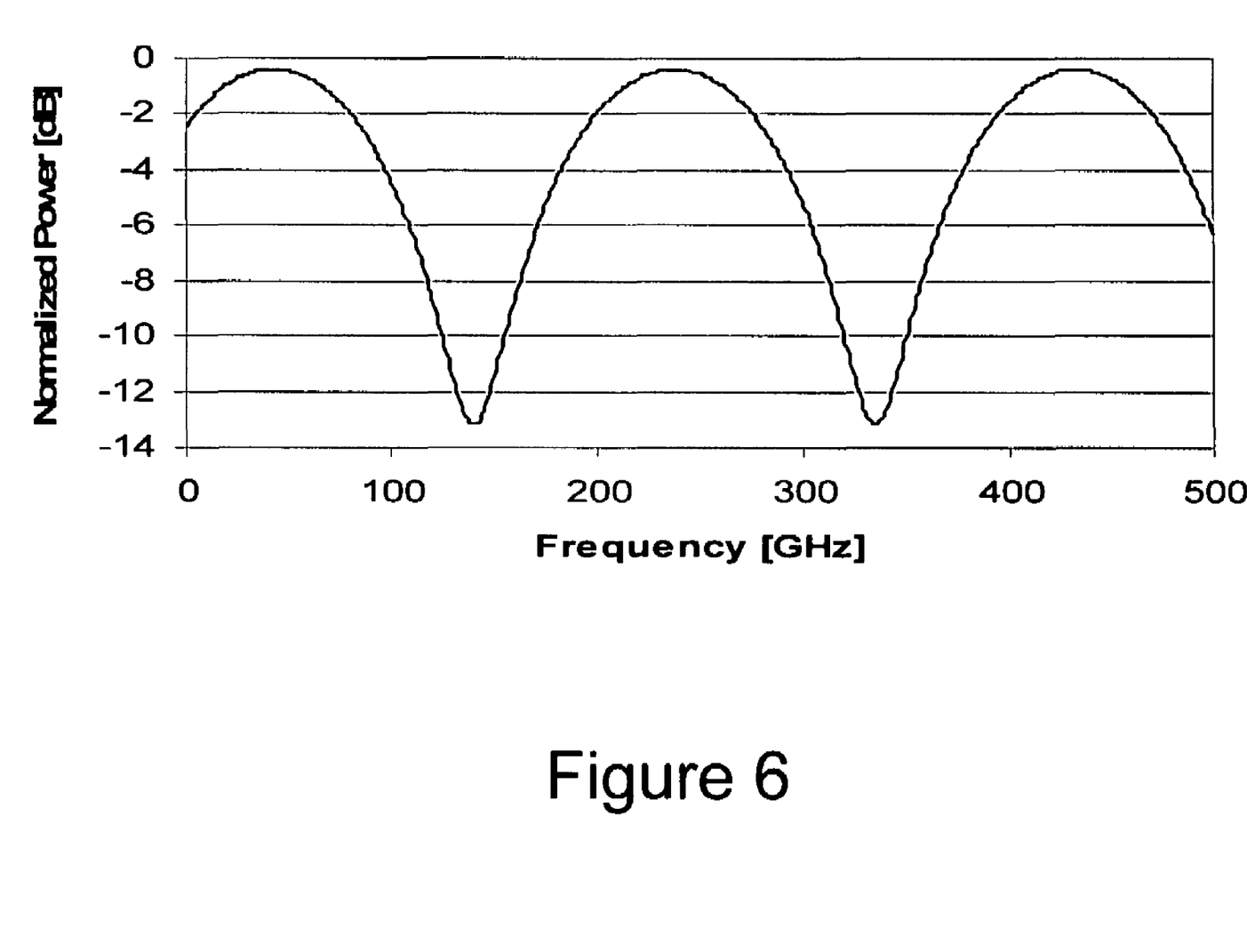
FIG. 6 is another graph of the optical filtering function of FIG. 5.

In FIG. 5 is shown a typical spectral response of the filter embodiment as described in connection with FIG. 2, as a function of frequency. In this particular case, the length of the filter fiber is 242 mm to ensure the required transmission peak separation of 200 GHz. Transmission percentage exceeds 90%. FIG. 6 shows the spectral response of the same filter embodiment represented in FIG. 5, but shown in units of dB. The extinction ratio exceeds 10 dB.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of producing a low-loss spectrally periodic all fiber filter, the method comprising the steps of:
providing a multi-mode fiber capable of propagating an LP01 mode and an LP02 mode at wavelengths of interest;
providing a single-mode fiber capable of propagating a fundamental mode at the wavelengths of interest; and
splicing a selected length of the multi-mode fiber between first and second lengths of the single-mode fiber,
wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 70%, and the extinction of the resulting filter is at least 10 dB.

2. The method of claim 1 wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 80%.

3. The method of claim 1 wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 90%.

4. The method of claim 1 further comprising the step of monitoring light passing through the spliced length of the multi-mode fiber while tapering the multi-mode fiber to adjust the spectral profile of the filter.

5. The method of claim 1 wherein the step of splicing comprises mechanical splicing.

6. The method of claim 1 wherein the step of splicing comprises fusion splicing.

7. The method of claim 1 wherein the step of providing a single-mode fiber capable of propagating a fundamental mode at the wavelengths of interest further comprises providing a parabolic core pigtail fiber with effective area of about 20 $\mu m^2$.

8. The method of claim 7 further comprising the step of thermally diffusion-expanding the core of the single mode fiber at ends thereof away from said multi-mode fiber and splicing said ends to fibers with effective areas larger than 20 $\mu m^2$.

9. The method of claim 7 further comprising the step of splicing the single mode fiber at ends thereof away from said multi-mode fiber to dispersion compensating fiber.

10. A low-loss spectrally periodic all fiber filter comprising:
two lengths of a single-mode fiber capable of propagating a fundamental mode at the wavelengths of interest; and
a length of a multi-mode fiber capable of propagating an LP01 mode and an LP02 mode at wavelengths of interest, the multi-mode fiber being spliced between the two lengths of single-mode fiber;
wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 70%, and the extinction ratio of the filter is at least 10 dB.

11. The filter of claim 10 wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 80%.

12. The filter of claim 10 wherein the properties of the multi-mode fiber and the single-mode fiber are related such that the optical field distribution resulting from the coherent superposition of the optical field of the LP01 mode and the optical field of the LP02 mode in the multi-mode fiber is sufficiently similar to the optical field distribution of the fundamental mode in the single-mode fiber at the wavelengths of interest, such that transmission across the two splices taken together at the wavelengths of interests is at least 90%.

13. The filter of claim 10 wherein the multi-mode fiber is mechanically spliced between the two lengths of single-mode fiber via at least one mechanical splice.

14. The filter of claim 10 wherein the multi-mode fiber is fusion spliced between the two lengths of single-mode fiber.

15. A method of producing a low-loss spectrally periodic all fiber filter, the method comprising the steps of:
providing a multi-mode fiber including a central core, a moat, and a ring, and capable of propagating an LP01 mode and an LP02 mode at wavelengths of interest;
providing a single-mode fiber capable of propagating a fundamental mode at the wavelengths of interest; and
splicing a selected length of the multi-mode fiber between lengths of the single-mode fiber, wherein the properties of the multi-mode fiber are such that the coherent superposition of the optical field of the LP01 mode and the optical field of the LP02 mode has a principally canceling effect in the ring portion of the fiber and a principally additive effect in the central core portion of the fiber, such that transmission across the two splices taken together at the wavelengths of interests is at least 70%, and the extinction ratio of the resulting filter is at least 10 dB.

16. The method of claim 15 wherein transmission across the two splices taken together at the wavelengths of interests is at least 80%.

17. The method of claim 15 wherein transmission across the two splices taken together at the wavelengths of interests is at least 90%.

* * * * *